United States Patent
Agarwala et al.

(10) Patent No.: US 8,437,573 B1
(45) Date of Patent: May 7, 2013

(54) SYSTEMS AND METHODS FOR MASK GENERATION FOR AN IMAGE OR VIDEO

(75) Inventors: Aseem Agarwala, Seattle, WA (US); Yuanzhen Li, Cambridge, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1324 days.

(21) Appl. No.: 11/986,476

(22) Filed: Nov. 21, 2007

Related U.S. Application Data

(60) Provisional application No. 60/966,955, filed on Aug. 31, 2007.

(51) Int. Cl.
*G06K 9/20* (2006.01)
(52) U.S. Cl.
USPC .................................................. 382/283
(58) Field of Classification Search .............. 382/159, 382/224, 282, 283
See application file for complete search history.

(56) References Cited

U.S. PATENT DOCUMENTS

| | | | | |
|---|---|---|---|---|
| 5,917,951 | A * | 6/1999 | Thompson et al. | 382/237 |
| 2004/0183812 | A1* | 9/2004 | Raskar et al. | 345/582 |
| 2005/0123183 | A1* | 6/2005 | Schleyer et al. | 382/131 |
| 2007/0064989 | A1* | 3/2007 | Chhibber et al. | 382/128 |

OTHER PUBLICATIONS

Lischinski, Dani et al., "Interactive Local Adjustment of Tonal Values," web page at http://www.cs.huji.ac.il/~danix/itm/, as available via the internet and printed Sep. 6, 2007.

\* cited by examiner

*Primary Examiner* — John Strege
(74) *Attorney, Agent, or Firm* — Kilpatrick Townsend & Stockton LLP

(57) ABSTRACT

Methods and systems for mask generation for an image or video are disclosed. In one embodiment, the method for creating a mask associated with an image includes receiving a first input of pixels of the image to be included in the mask. The method further includes receiving a second input of pixels of the image to not be included in the mask. The method also includes creating a classifier to classify each pixel of the image as included in the mask, not included in the mask, or unsure. The method also includes training the classifier using the first input of pixels and the second input of pixels. The method further includes classifying each pixel of the image as included in the mask, not included in the mask, or unsure.

25 Claims, 20 Drawing Sheets

(5 of 20 Drawing Sheet(s) Filed in Color)

SYSTEMS AND METHODS FOR MASK GENERATION FOR AN IMAGE OR VIDEO

CROSS-REFERENCE TO RELATED APPLICATION

This application claims priority to U.S. Provisional Patent Application No. 60/966,955 filed Aug. 31, 2007, entitled "Systems and Methods for Mask Generation for an Image or Video," the entirety of which is hereby incorporated by reference.

FIELD OF THE INVENTION

Embodiments of the invention relate generally to the field of data processing systems. For example, embodiments relate to systems and methods for generation of a mask for an image or video.

BACKGROUND

The use of masks is prevalent in image manipulation. For a digital image, a user defines a mask and the application splits the image into layers, one layer being the area within the mask and one layer being the area outside of the mask. The remaining portion of the layers may then be filled in with a solid color, such as black, for easy manipulation of the remaining image in the layer by the user. Traditionally, mask generation of an image is a tedious process of manually selecting portions of an image to be part of a mask. For example, a user may use a lasso tool in image software to define a portion of an image to be part of a mask. The lasso tool, though, requires the user to be precise in drawing edges of where the mask should exist. Tools exist within the applications to select areas with similar color. For example, such tools allow a user to select a pixel, wherein the tool expands the selection to neighboring pixels that are within a defined color of the selected pixel.

One problem with these tools is that they are unable to handle fragmented regions of an image. For example, in attempting to create a mask to include the leaves of a tree in an image, the background of the image may show between the leaves such that the user needs to select each leave in the image in order to create the mask. Another problem is that the tools do not allow easy creation of a mask wherein many different colors exist. For example, a Leopard has many spots and face of different color than the rest of the body. Therefore, a user needs to select all of the spots, rest of the body, and any portion missed to select the entire Leopard. Another problem is that the masks created by present tools are typically with hard edges with little allowance for blending. Another problem is that present tools grow user selections in order to create a region, thus, whether an area of an image is included in the region is directly related to the proximity to the user selections.

SUMMARY

Methods and systems for mask generation for an image or video are disclosed. In one embodiment, the method for creating a mask associated with an image includes receiving a first input of pixels of the image to be included in the mask. The method further includes receiving a second input of pixels of the image to not be included in the mask. The method also includes creating a classifier to classify each pixel of the image as included in the mask, not included in the mask, or unsure. The method also includes training the classifier using the first input of pixels and the second input of pixels. The method further includes classifying each pixel of the image as included in the mask, not included in the mask, or unsure.

This illustrative embodiment is mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and other features, aspects, and advantages of the present invention are better understood when the following Detailed Description is read with reference to the accompanying drawings, wherein.

DETAILED DESCRIPTION OF PREFERRED EMBODIMENTS

Embodiments of the present invention comprise systems, methods, and products for generation of a mask of an image or video. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

In one embodiment, a mask covers pixels of an image and allows a user to modify the rest of the pixels of the image without modifying the covered pixels in the image. In order to create the mask, in one embodiment, the user selects a group of pixels to be covered by the mask and a group of pixels to not be covered by the mask. The mask generation system uses the two groups of pixels in order to train a classifier that determines whether each pixel of the image is to be (1) included in the mask, (2) not included in the mask, or (3) the classifier determines that the pixel is not definitely in the mask or not in the mask (in the following description, the classifier is thus "unsure").

In one embodiment, the classifier does not use a pixel's position in the image to determine the pixel's status (the decision is position-independent). In one embodiment, the classifier uses a plurality of subclassifiers like a weighted voting system in order to determine a pixel's status. Upon the classifier classifying the pixels, in one embodiment, the mask generation system grows the group of pixels classified as in the mask and the group of pixels classified as not in the mask in order to decide whether the unsure pixels are to be included in the mask are not to be included in the mask.

Therefore, the mask may be generated and the image modified. For video, the classifier may be used to classify pixels of a sequence of images wherein a user selected groups of pixels in at least one of the images in the sequence. In one embodiment, user input may be given for a subset of the images in the sequence for video.

Illustrative System for Image Mask Generation

Figure 1:
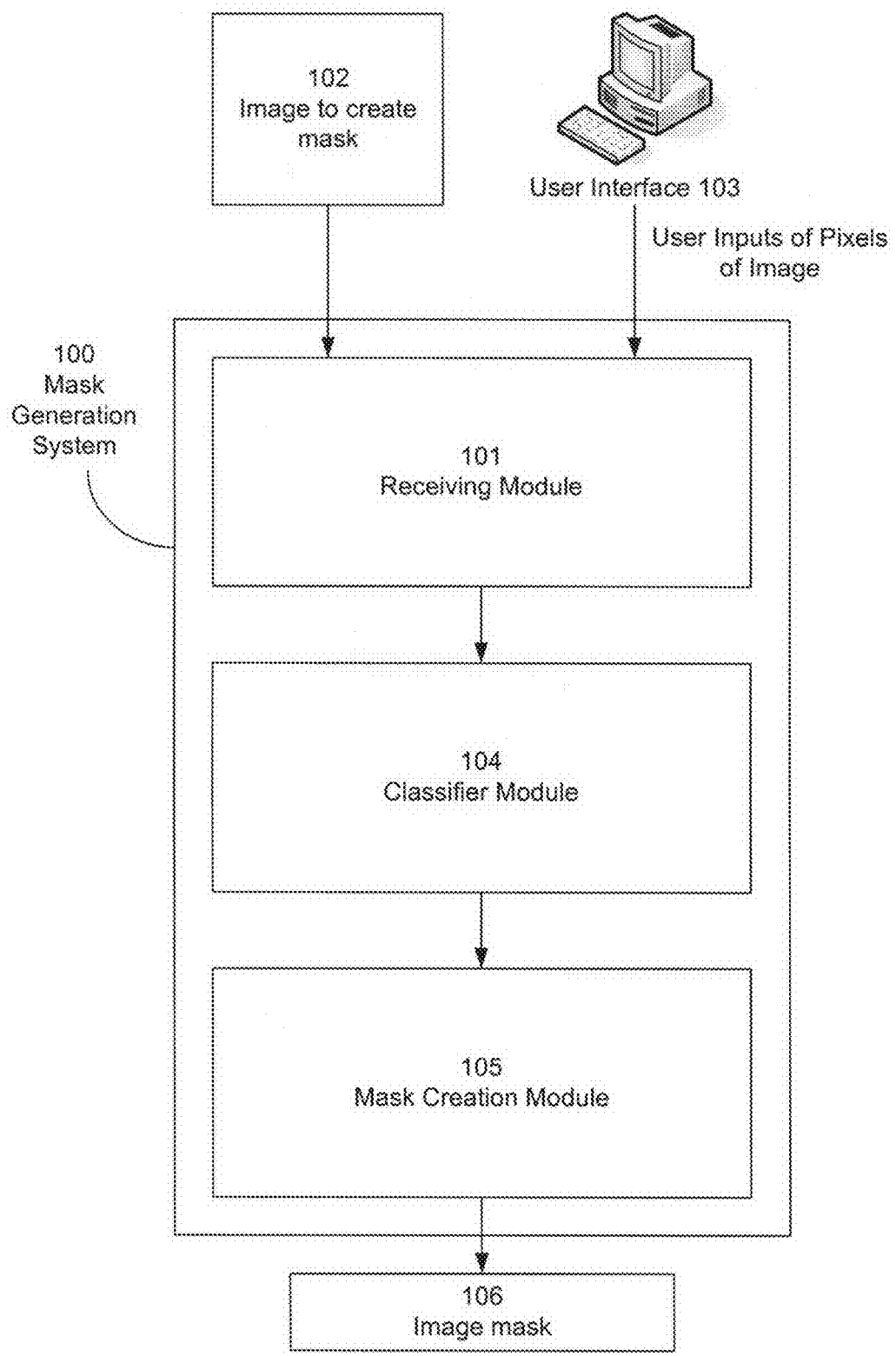
FIG. 1 shows an illustrative system 100 for generating an image mask for an image or video.

FIG. 1 illustrates an example mask generation system 100 for generating a mask for an image or video. The system 100 generally comprises a receiving module 101 to receive an image for which to generate a mask 102 and a first input of pixels and a second input of pixels from the user interface 103. For mask generation for an image (e.g., image 102), the user inputs may be of pixels in the image. For mask generation for a video, the user inputs may be of pixels in the image or another image in the sequence of images in the video. In one embodiment, the user interface is an image manipulation application executing on a computer in order for a user to provide feedback for or view the image 102.

In one embodiment, the mask generation system 100 further comprises a classifier module 104 create and train a classifier to classify the pixels of the image 102 as included in the mask, not included in the mask, or unsure. The classifier module 104 may then use the trained classifier to classify the pixels of the image 102. The mask generation system 100 may also comprise a mask creation module 105 to receive the unsure pixels from the classifier module 104 and determine whether the unsure pixels are to be included in the mask or not to be included in the mask. In one embodiment, the mask generation module 105 may then creation the mask 106 for the image 102 from the classified pixels.

Exemplary Method for Mask Generation for an Image

Figure 2:
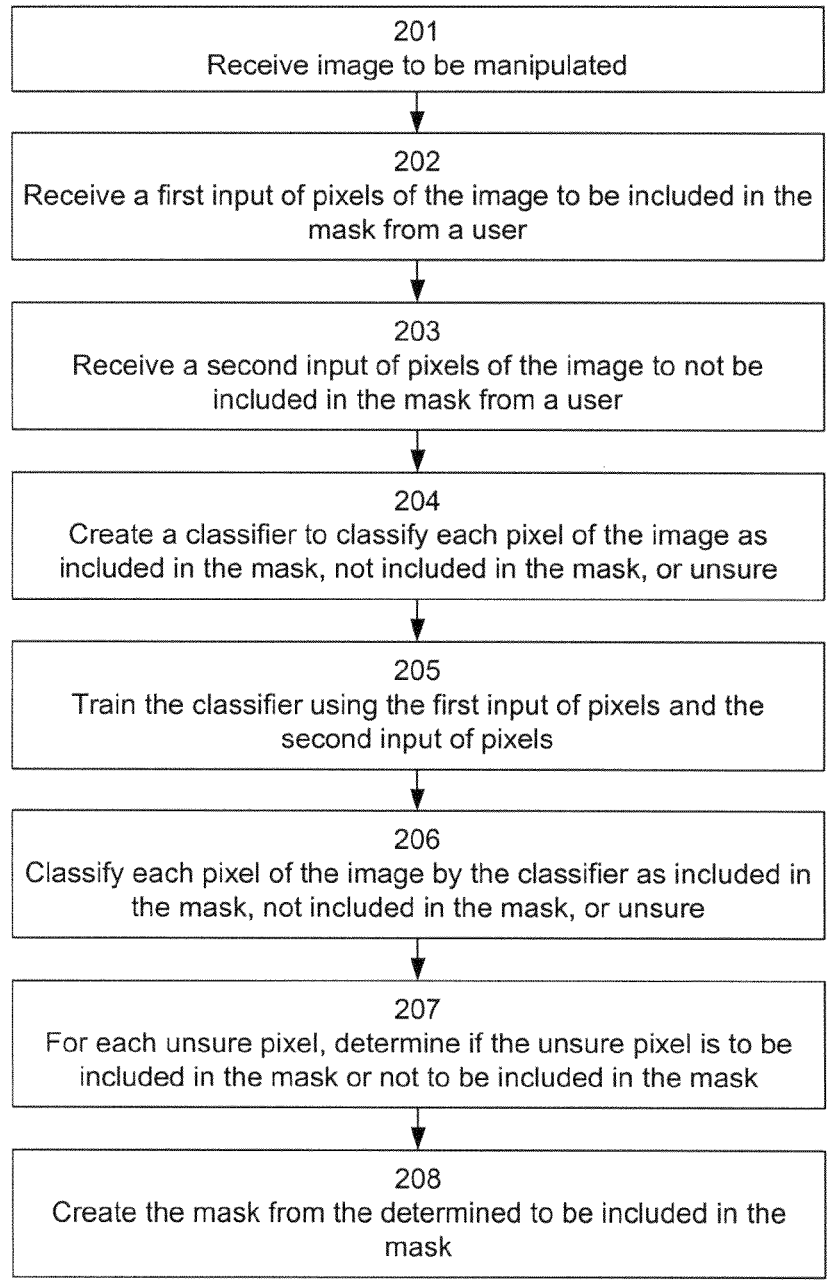
FIG. 2 illustrates an exemplary method of the illustrative system 100 in FIG. 1 for generating an image mask.
Figure 4:
FIG. 4 shows a color photograph of a sculpture for a mask to be generated.
Figure 5:
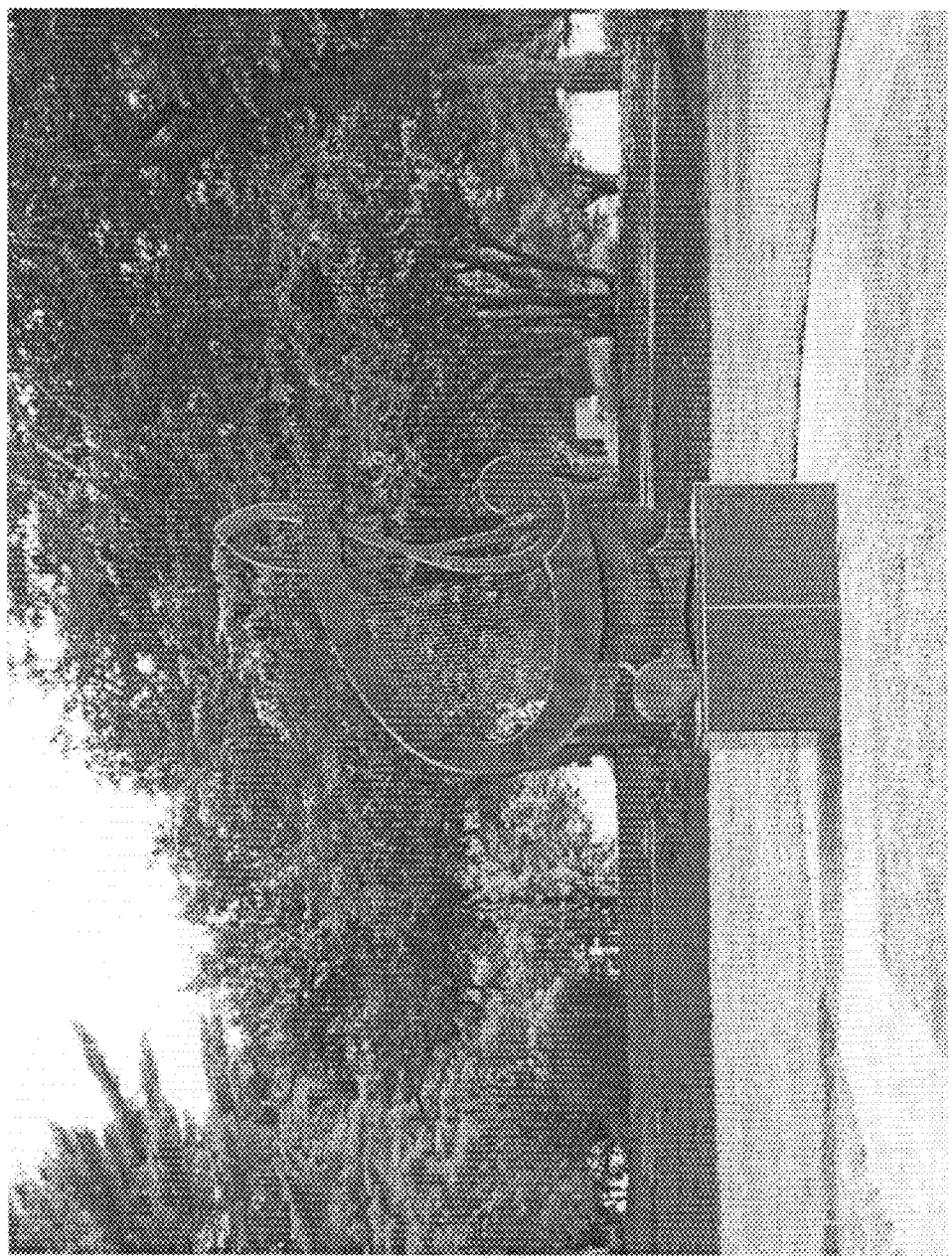
FIG. 5 shows a grayscale photograph of the color photograph of FIG. 4.
Figure 6:
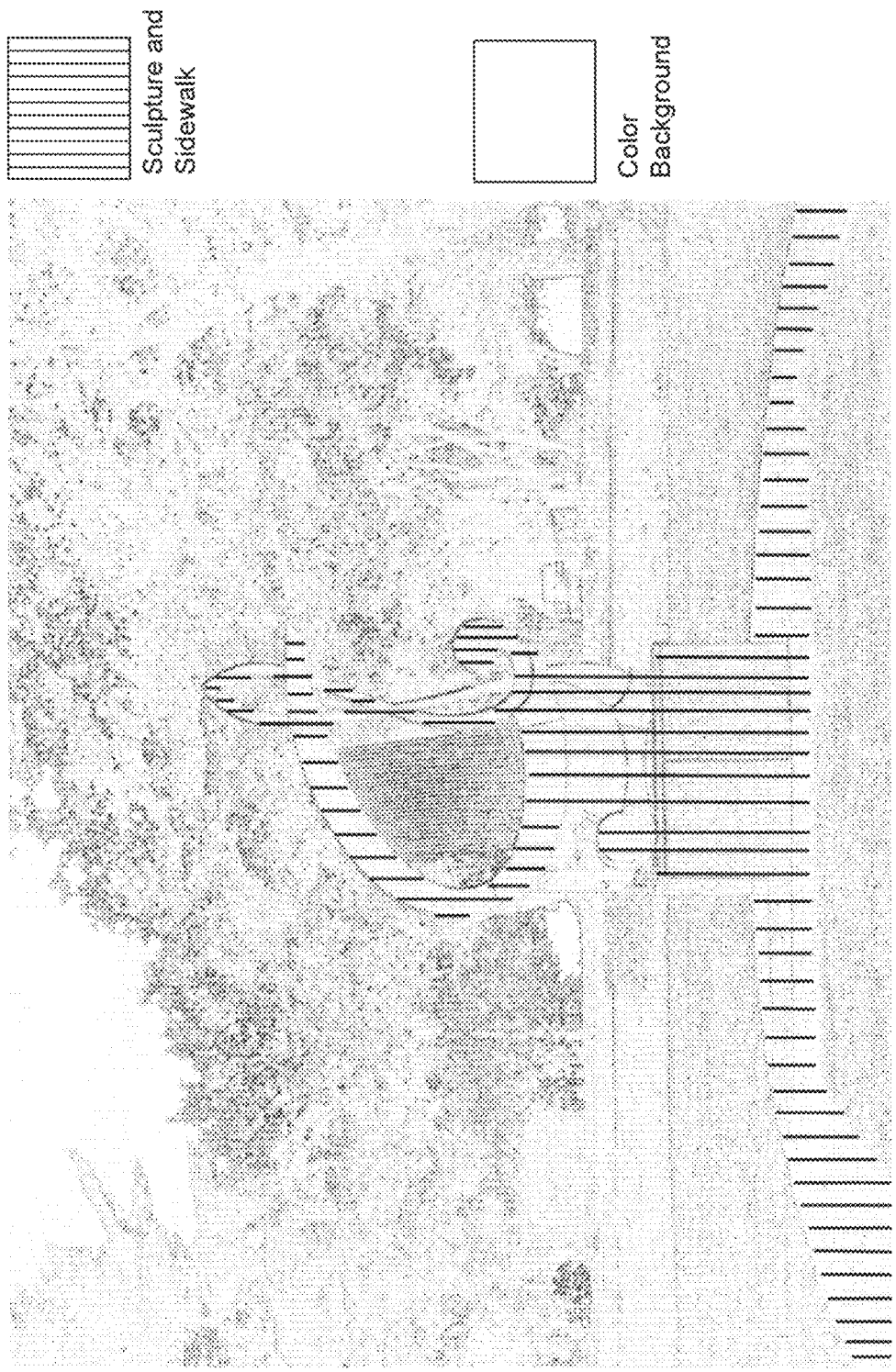
FIG. 6 shows a line form image of the color photograph of FIG. 4.
Figure 13:
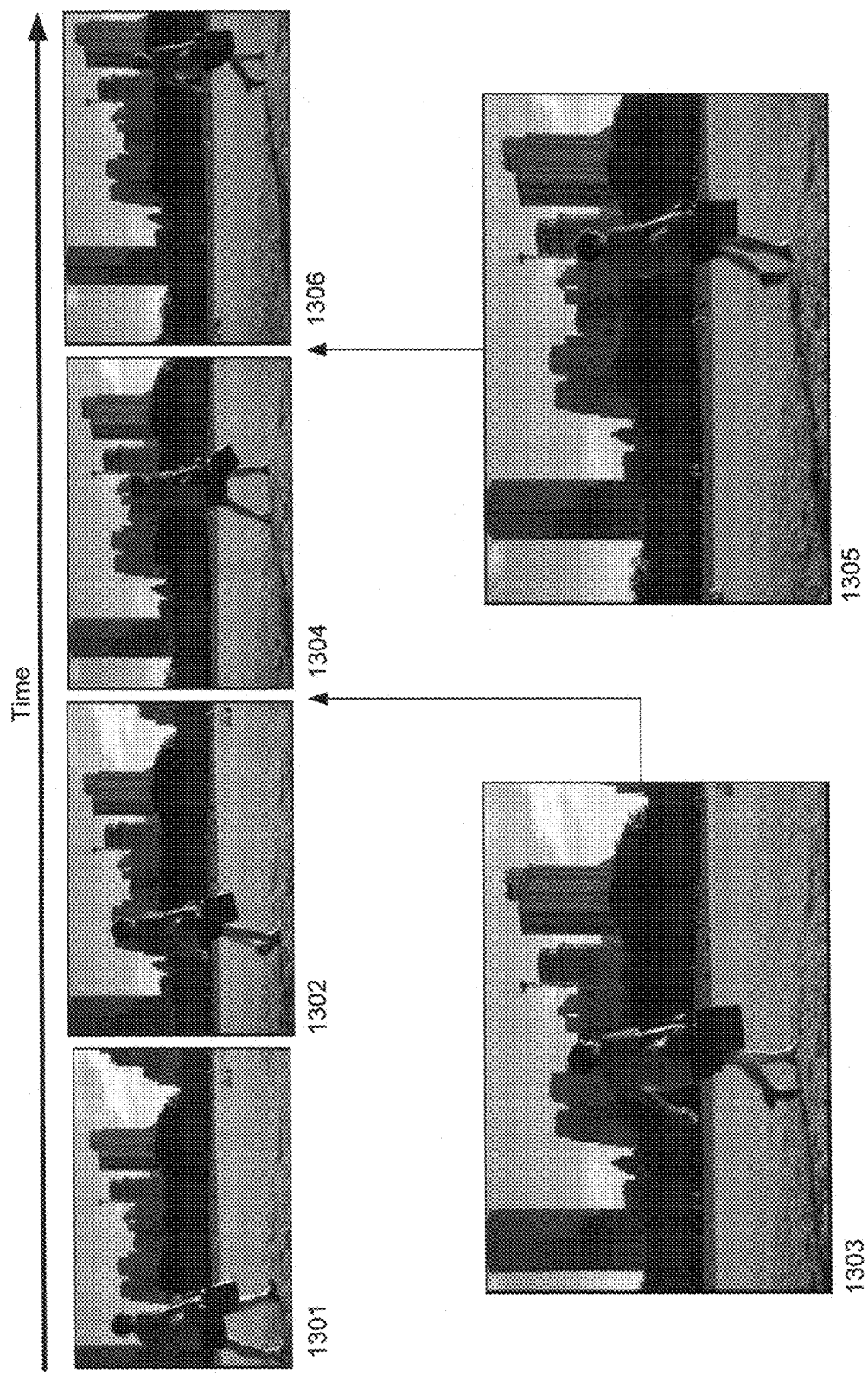
FIG. 13 shows a sequence of color images of a video for a mask to be generated.
Figure 14:
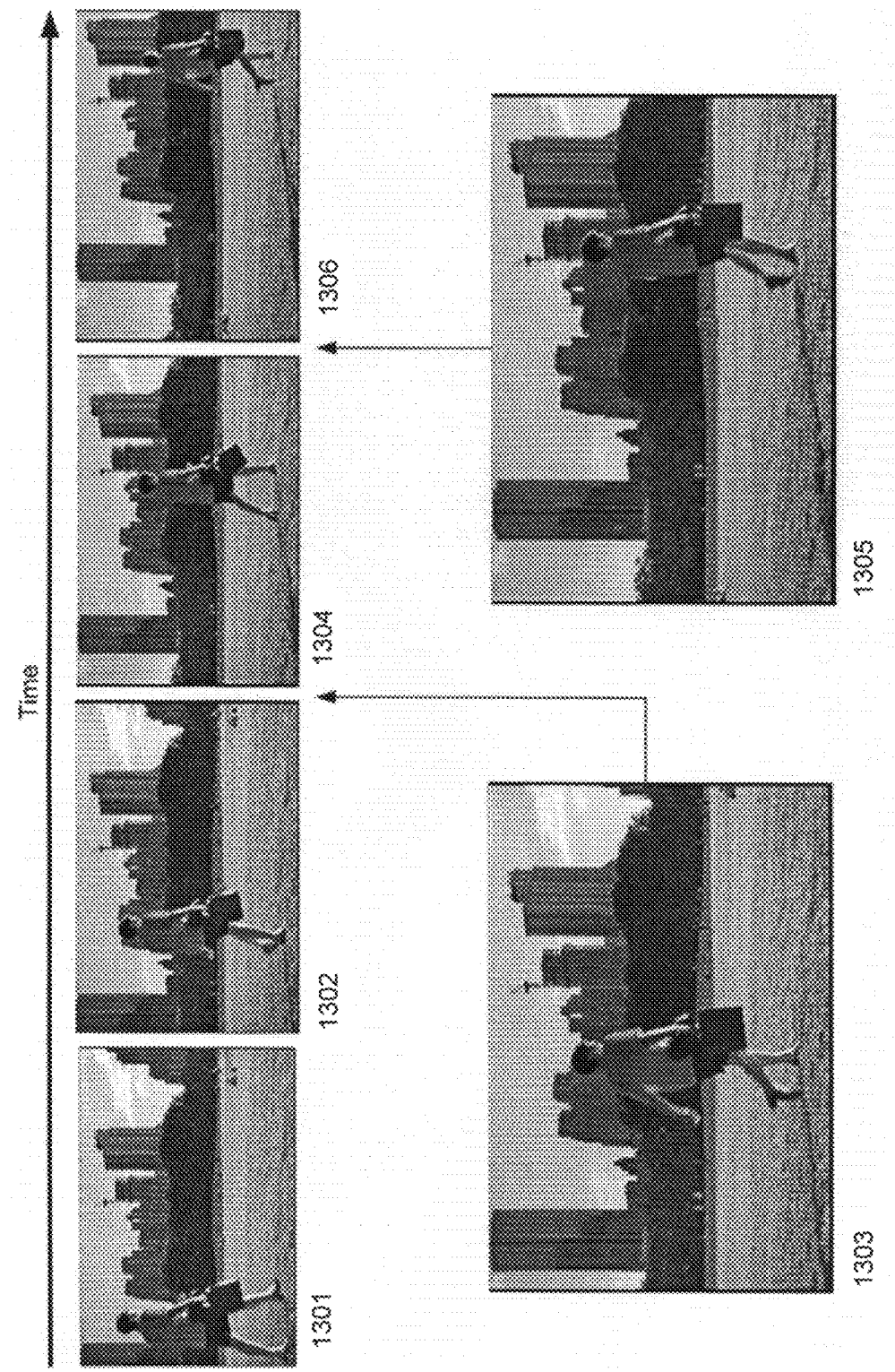
FIG. 14 shows the sequence of images in FIG. 13 in grayscale.
Figure 15:
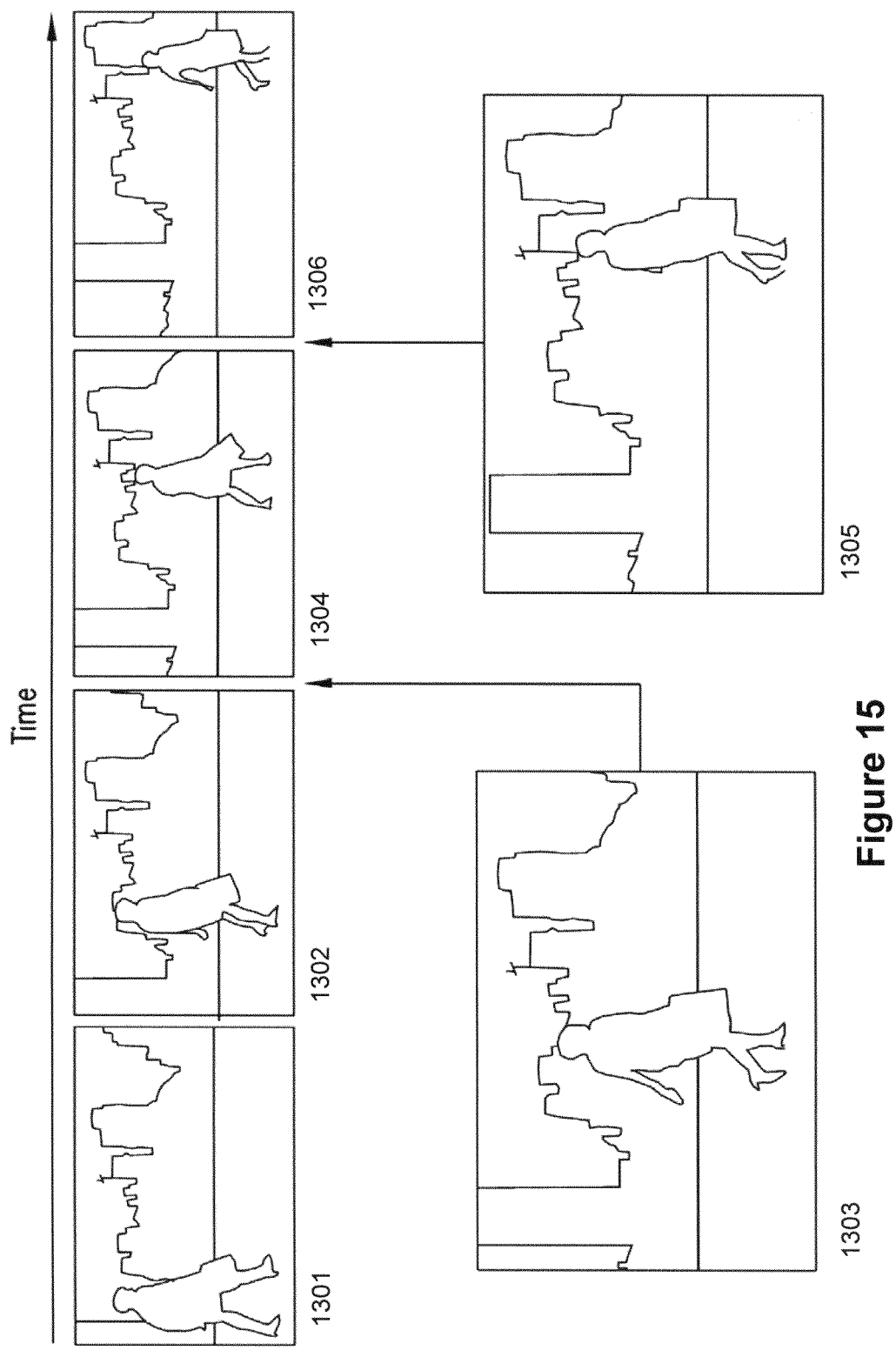
FIG. 15 shows the sequence of images in FIG. 13 in line form.

FIG. 2 illustrates an exemplary method for generating an image mask 106 by the mask generation system 100. Beginning at 201, the receiving module 101 receives the image 102 to be modified or for which a mask is to be generated. In one embodiment of receiving the image 102, the image 102 is loaded into an image editing software or other application. FIGS. 4 and 1303, 1305 of FIG. 13 illustrate example color images 102. FIGS. 5 and 14 illustrate grayscale versions of the color images in FIGS. 4 and 13, respectively. FIGS. 6 and 15 illustrate line form versions of the color images in FIGS. 4 and 13, respectively. The line form versions allow the naked eye to perceive example modifications to the images without viewing the color images of the Figures.

Figure 7:
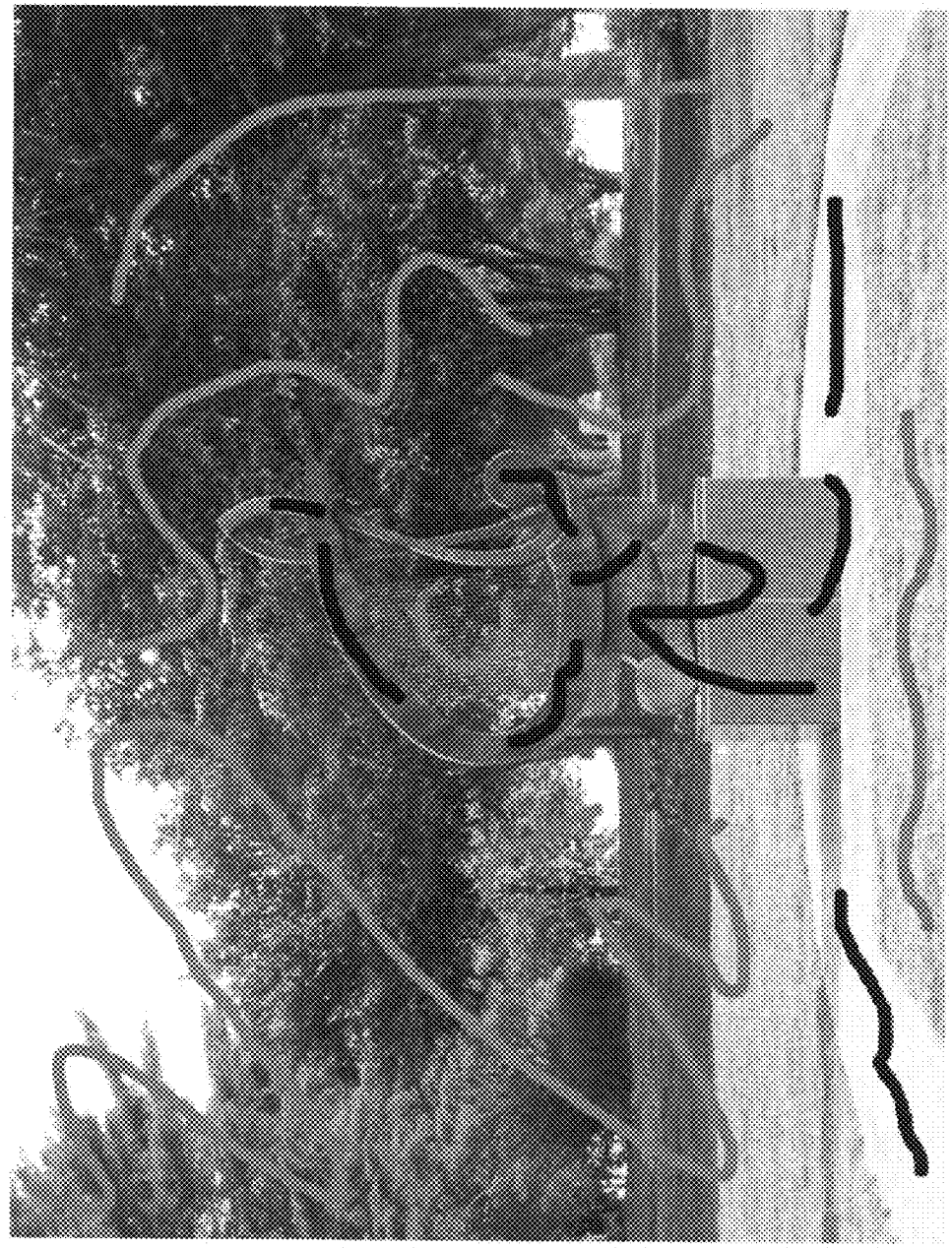
FIG. 7 shows a color photograph of a first user input of pixels and a second user input of pixels of the color photograph of FIG. 4.
Figure 8:
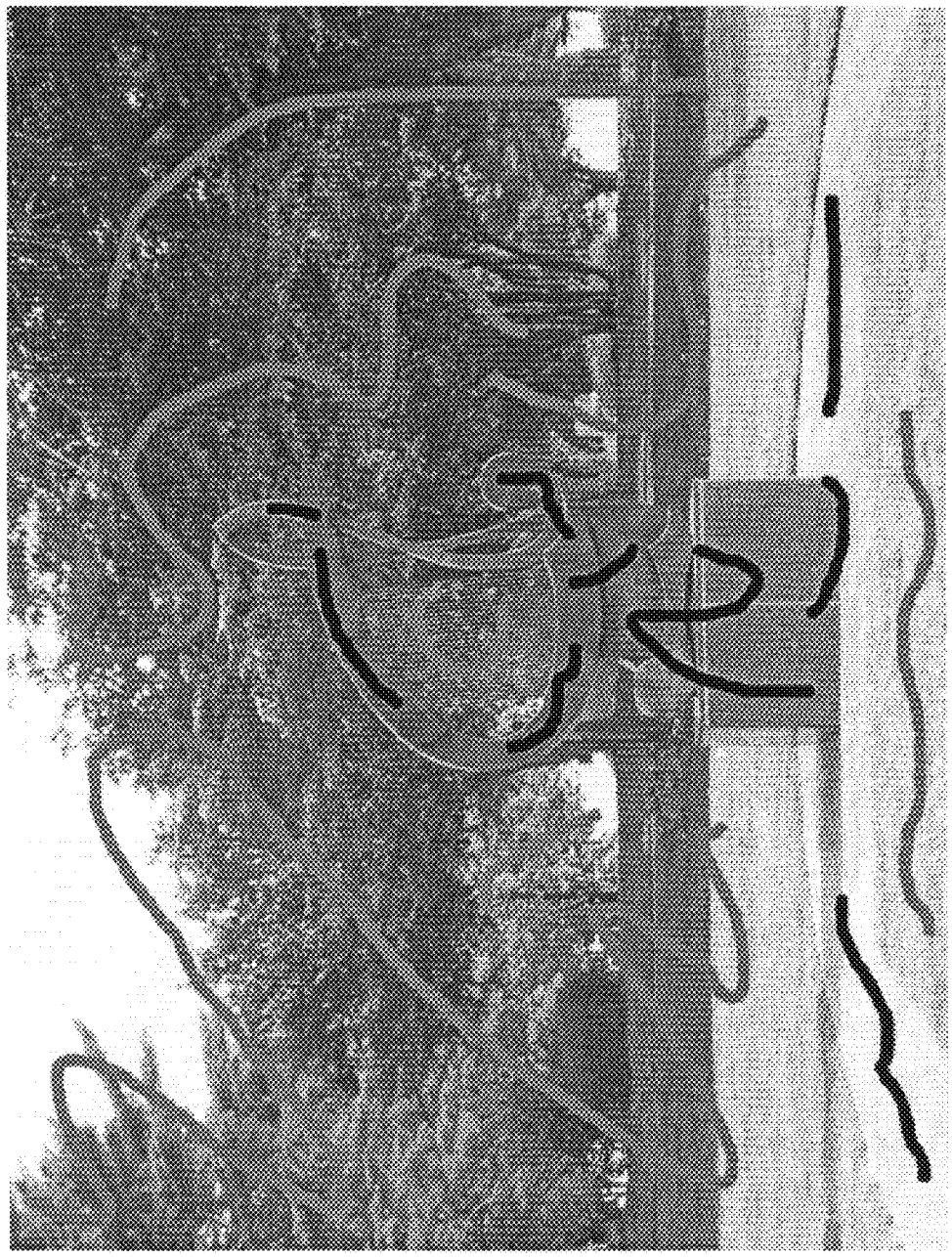
FIG. 8 shows a grayscale photograph of the color photograph of FIG. 7.
Figure 9:
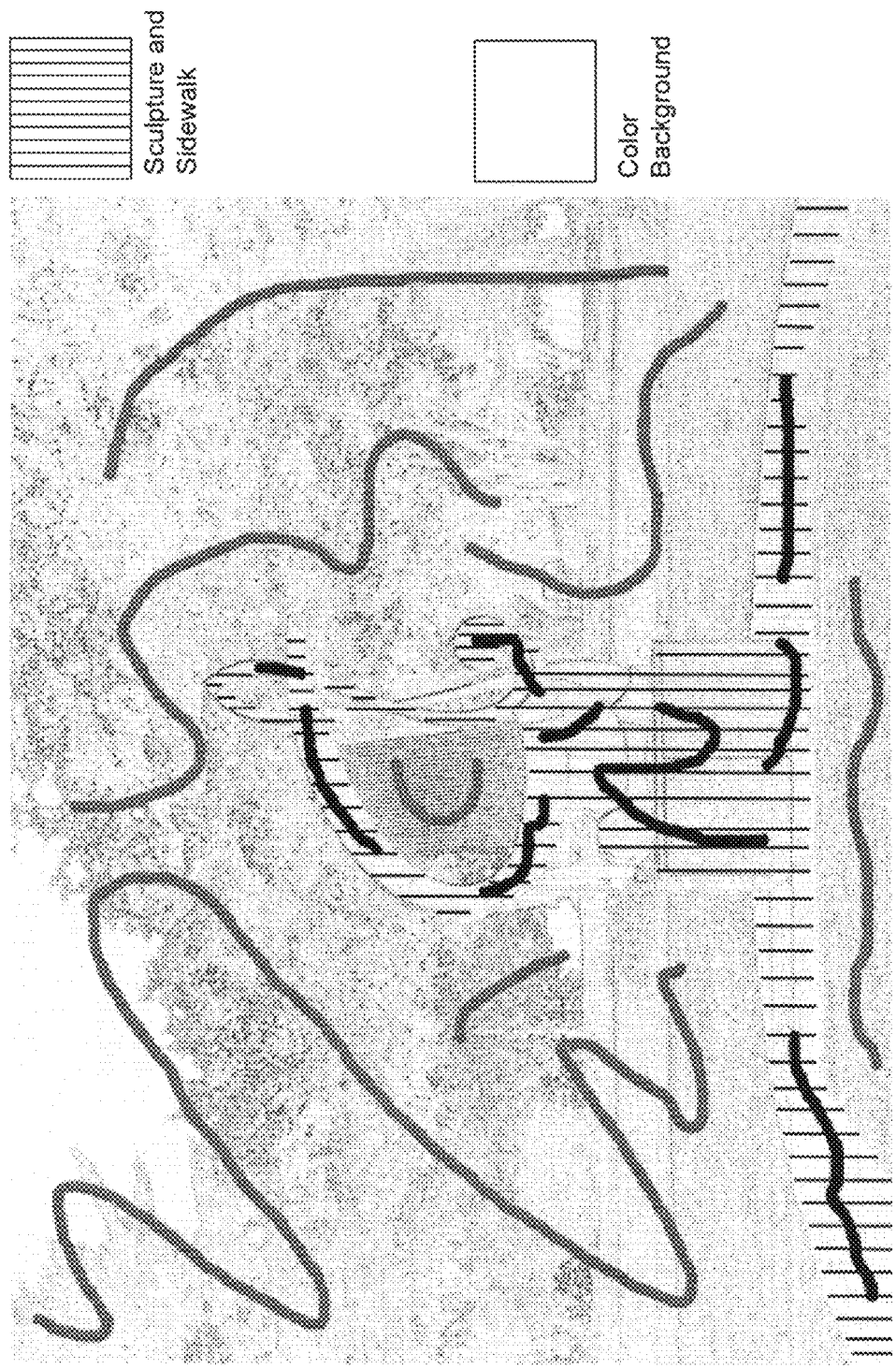
FIG. 9 shows a line form image of the color photograph of FIG. 7.

Proceeding to 202, the receiving module 101 receives a first user input of pixels of image 102 from the user interface 103 to be included in the mask. Proceeding to 203, the receiving module 101 receives a second user input of pixels of image 102 from the user interface 103 to not be included in the mask. In one embodiment, digital brush strokes are used to highlight and define the first and second inputs (e.g., the gray and black strokes in FIG. 7). In another embodiment, a spot selection tool or pixel coordinates are given for the first or second inputs.

Proceeding to 204, the classifier module 104 may create a classifier from the first and second user inputs to classify the pixels of the image 102 as included in the mask, not included in the mask, or unsure. In one embodiment, a pixel is classified as included in the mask if the classifier value for the pixel is greater than the sum of zero and an error constant, not in the mask if the classifier value is less than zero minus the error constant, and unsure if the classifier value is within the error constant of zero. In one embodiment, the classifier may be a collection of subclassifiers, wherein each subclassifier may attempt to classify a pixel of an image based on one characteristic of the pixel. Example characteristics include, but are not limited to, color (e.g., RGB, LAB) and texture. Subclassifiers may therefore classify pixels based on, for example, the green value of a pixel or the luminance of the pixel.

In one embodiment of the classifier, the features of pixel characteristics to create subclassifiers include:
  R, G, B and L, a, b color values. In one embodiment of the subclassifiers two features may be used. As a result, the L, a, and b values, as linear and nonlinear transformations of the R, G, B values, may not be redundant and thus useful for the classification process. In another embodiment, the number of features used by the subclassifier is 3. As a result, L may be excluded from the feature set since L may be a linear combination of R, G, B (a and b may still be useful since they are nonlinearly related to R, G, B);
  Oriented energy as texture features. In one embodiment, the image 102 is filtered with scale and orientation selective filters. The filter outputs may then be rectified by taking the absolute values of the outputs. In one embodiment, the texture energy feature may then be the spatially blurred, rectified values, which may be multiscale, orientation selective energy values. In one embodiment, texture segmentation is used to create the feature values. In one embodiment, the texture segmentation may include 3 scales and 4 orientations;

Histogram of gradients (HoG) features. HoG features may capture the distribution of gradients within a spatial neighborhood;

Upon creating subclassifiers from the features, in one embodiment, the classifier including the subclassifiers is a weighted vote checking system wherein the subclassifiers are to be trained.

Training the Classifier

Referring back to FIG. 2 and proceeding to 205, the classifier module 104 trains the classifier using the first and second input of pixels. In one embodiment, the algorithm Adaboost or other training algorithm is used to train the classifier. To train, a weak learner may be repeatedly called for a plurality of subclassifiers attempting to classify a group of pixels of an image, wherein the group is a subset of pixels from the two user inputs of pixels. Therefore, the pixels in the group are predetermined as included in the mask or not included in the mask, thus allowing the system to determine whether a subclassifier being trained misclassified a pixel.

Figure 3:
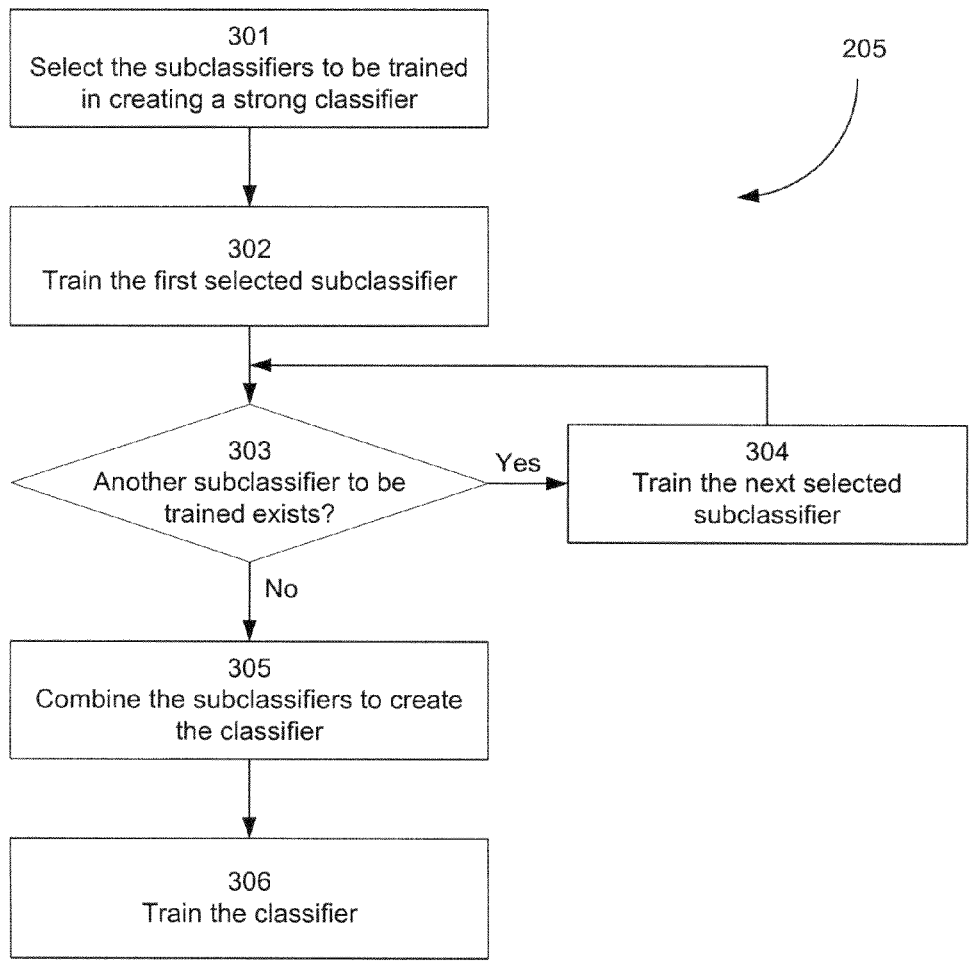
FIG. 3 illustrates an exemplary method 205 to train a classifier in FIG. 2.

FIG. 3 shows an example method for training the classifier in 205 of FIG. 2. Beginning at 301, subclassifiers (e.g., from features RGB, LAB, and texture) are selected in creating the classifier. Any number of subclassifiers may be used in embodiments of the invention. In one embodiment, for each pixel, the color, oriented energy, and HoG features are concatenated into a multi-dimensional feature vector. The feature vectors may be denoted as xi, and the pixel labels as yi (e.g., yi=1 for example pixels, and yi=−1 for negative example pixels). In one embodiment, examples are selected for training the subclassifiers. Examples may be pixels that are of a subset of the two user inputs of pixels. Some examples may be more difficult to classify than other examples. Therefore, in one embodiment, through multiple iterations of a training algorithm, the system may focus more on the difficult examples to train the subclassifiers and classifier. In order to do so, in one embodiment, weights of examples are initialized, as shown in equations 1 and 2:

$$w_{1,i}=\tfrac{1}{2}m \text{ for } y_i=1 \text{ and } m>0 \quad (1)$$

$$w_{1,i}=\tfrac{1}{2}l \text{ for } y_i=-1 \text{ and } l<0 \quad (2)$$

Where m is the number of positive examples and l is the number of negative examples.

Proceeding to 302, the first subclassifier is trained (e.g., subclassifier for R and G values) using reiterations of examples. The classifier module 104 then determines if another subclassifier is to be trained in 303. If another subclassifier is to be trained, then the classifier module 104 trains the next selected subclassifier in 304 (e.g., subclassifier for gradient values). The process then returns to 303. In one embodiment of training the subclassifiers, the number of features of each subclassifier is restricted to a final group of features. In one embodiment, Fisher's linear discriminant analysis is used.

If no more subclassifiers are to be trained, then the subclassifiers are combined to create the classifier in 305. For example, if the classifier is a weighted sum of the subclassifiers, the subclassifier values are multiplied by a predefined weight for the subclassifier and combined. Proceeding to 306, the classifier module trains the classifier in 806.

In one embodiment of training the classifier, for $1 \leq t \leq T$, wherein T is the number of examples:

the example weights may be normalized, thus meaning that each example is initially of equal importance, as in equations 3 and 4:

$$\Sigma_{y_i=1} w_{t,i} = \tfrac{1}{2} \quad (3)$$

$$\Sigma_{y_i=-1} w_{t,i} = \tfrac{1}{2} \quad (4)$$

the error of the classified examples hj (for j=1, ..., J examples) may be evaluated using the examples. The error of classification by subclassifiers (h) for an example is depicted in equation 5:

$$\epsilon_j = \Sigma_i w_i |h_j(x_i) - y_i|/2 \quad (5)$$

the example with the lowest error ($\epsilon_j$) or below a minimum error may be selected;

for the selected example(s), the weight is decreased (correctly classified example weights are decreased), as in equation 6:

$$w_{t+1,i} = w_{t,i}\beta_t \text{ if } h_t(x_i) = y_i \text{ where } \beta_t = \epsilon_t/1 - \epsilon_t \quad (6)$$

the weight of examples incorrectly classified is kept unchanged.

The process may be repeated as desired to finalize the weights of the examples.

In one embodiment, the weights of the subclassifiers are modified using the weighted examples in order to minimize the misclassification of the classifier. In such an embodiment, $\alpha_t$ is the weight of a subclassifier and $\alpha_t = \log(\beta_t^{-1})$.

As a result, in one embodiment, the classifier is as in equation 7:

$$H(x) = 1 \quad \text{if } \sum_{t=1}^{T} \alpha_t h_t(x) \geq \frac{1}{2}\sum_{t=1}^{T} \alpha_t \quad (7)$$
$$H(x) = -1 \quad \text{otherwise}$$

H(x)=1 means a pixel is to be included in the mask. H(x)=−1 means the pixel is to not be included in the mask.

Misclassification of pixels by the classifier may occur. Therefore, in one embodiment, instead of thresholding the weighted sum of the subclassifiers, the weighted sum is determined to be a confidence level value for the pixel. An error constant may be defined as a threshold value around zero, such that a pixel is in the mask if a pixel's weighted sum of the subclassifiers is greater than the error constant, the pixel is not in the mask if the weighted sum is less than the negative of the error constant, and the pixel is classified as unsure if the weighted sum is within the error constant of zero. In one embodiment, the threshold is $$\frac{1}{2}\sum_{t=1}^{T} \alpha_t.$$

In one embodiment, heuristics may be used to determine the final threshold value. In another embodiment, the user may assist in setting the final threshold value, or a positive threshold value and a negative threshold value, as later described.

Determining the Threshold by a User

In one embodiment, a discrete, multi-valued vote map V and an inverted vote map $_iV$ are shown side by side with the image 102. The vote map V shows an image where the pixels are determined to be in the mask, and the inverted vote map shows which pixels are not to be included in the mask. The user may then be presented with a selection instrument (e.g., sliders) to pick two conservative thresholds t+ and $t_i$ such that, when Hi>t+ for a pixel, the pixel is in the mask and, when $_iHi>t_i$, the pixel is not in the mask. Therefore, the user may determine thresholds in order to prevent false positives (i.e., misclassification of pixels). In one embodiment, the classification of the user scribbled pixels are considered classified as in the mask or not in the mask. If a pixel is not scribbled, and has an Hi neither lower than $_it_i$ or higher than t+, it is classified as unsure.

Determining if Unsure Pixels are in the Mask or not in the Mask

Referring back to FIG. 2, upon the classifier being trained in 205 (with the thresholds for unsure pixels being defined), the classifier classifies the pixels of the image 102 as included in the mask, not included in the mask, or unsure in 206. Upon classifying the pixels in 207, the mask creation module 105 determines if each unsure pixel is to be included in the mask or not included in the mask in 207.

In one embodiment, an edge-aware propagation of the groups of pixels classified as in the mask and not in the mask is performed until the unsure pixels of the image 102 are reached. The edge aware propagation may be dependent on any image characteristic, including color or luminance of a pixel or area of the image 102. In other embodiments, any propagation technique may be used in determining whether the unsure pixels are to be included in the mask or not to be included in the mask.

Generating the Mask

Figure 10:
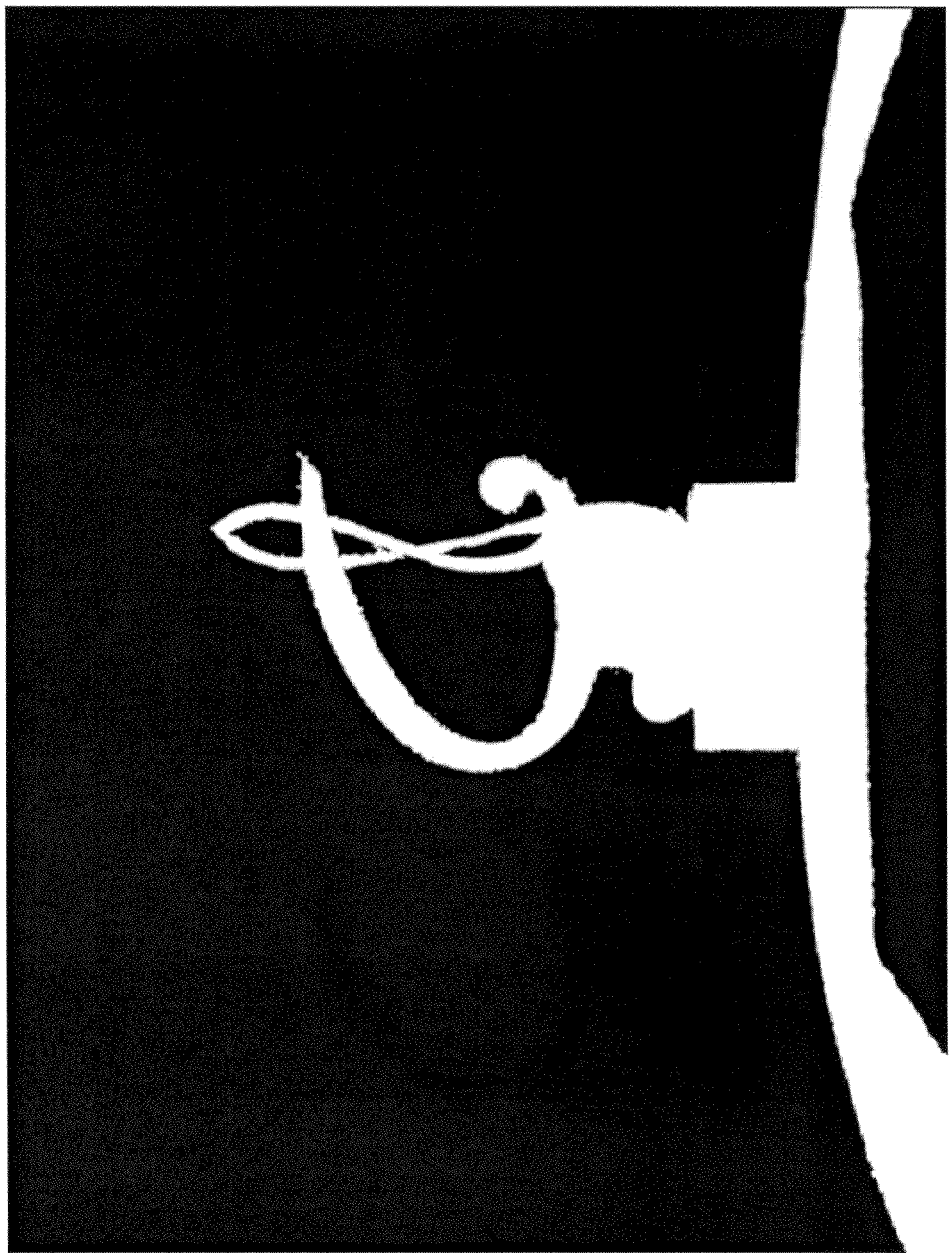
FIG. 10 shows an example mask generated for the image in FIG. 4 by the system 100 of FIG. 1.
Figure 11:
FIG. 11 shows a color photograph of an example modification to the image in FIG. 4 using the mask of FIG. 10, wherein the modification is grayscaling objects not in the mask.
Figure 12:
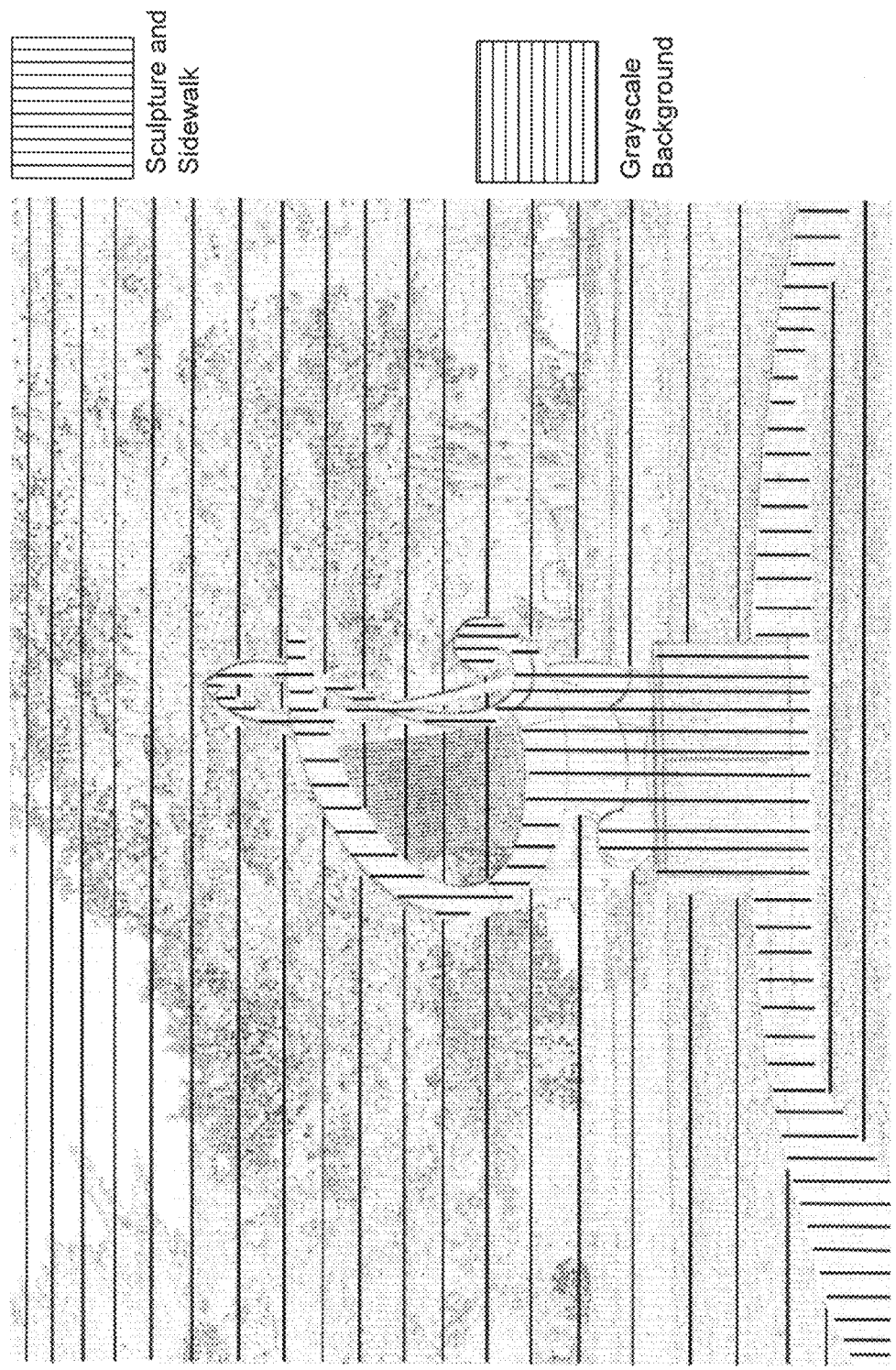
FIG. 12 shows a line form image of the modified color photograph of FIG. 11.
Figure 16:
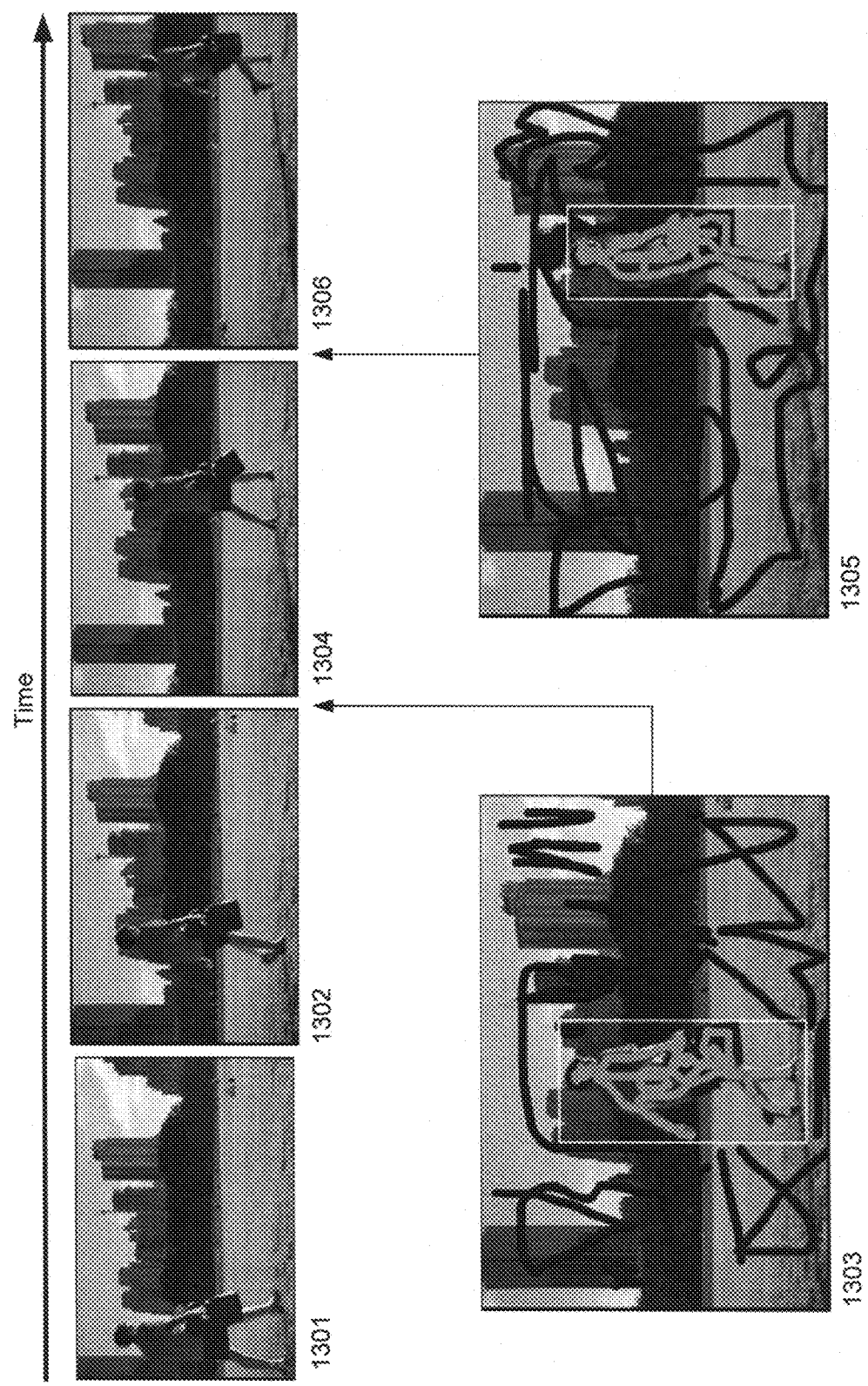
FIG. 16 shows a sequence of color photographs and a first user input of pixels and a second user input of pixels for two of the sequence of color images in FIG. 13.
Figure 17:
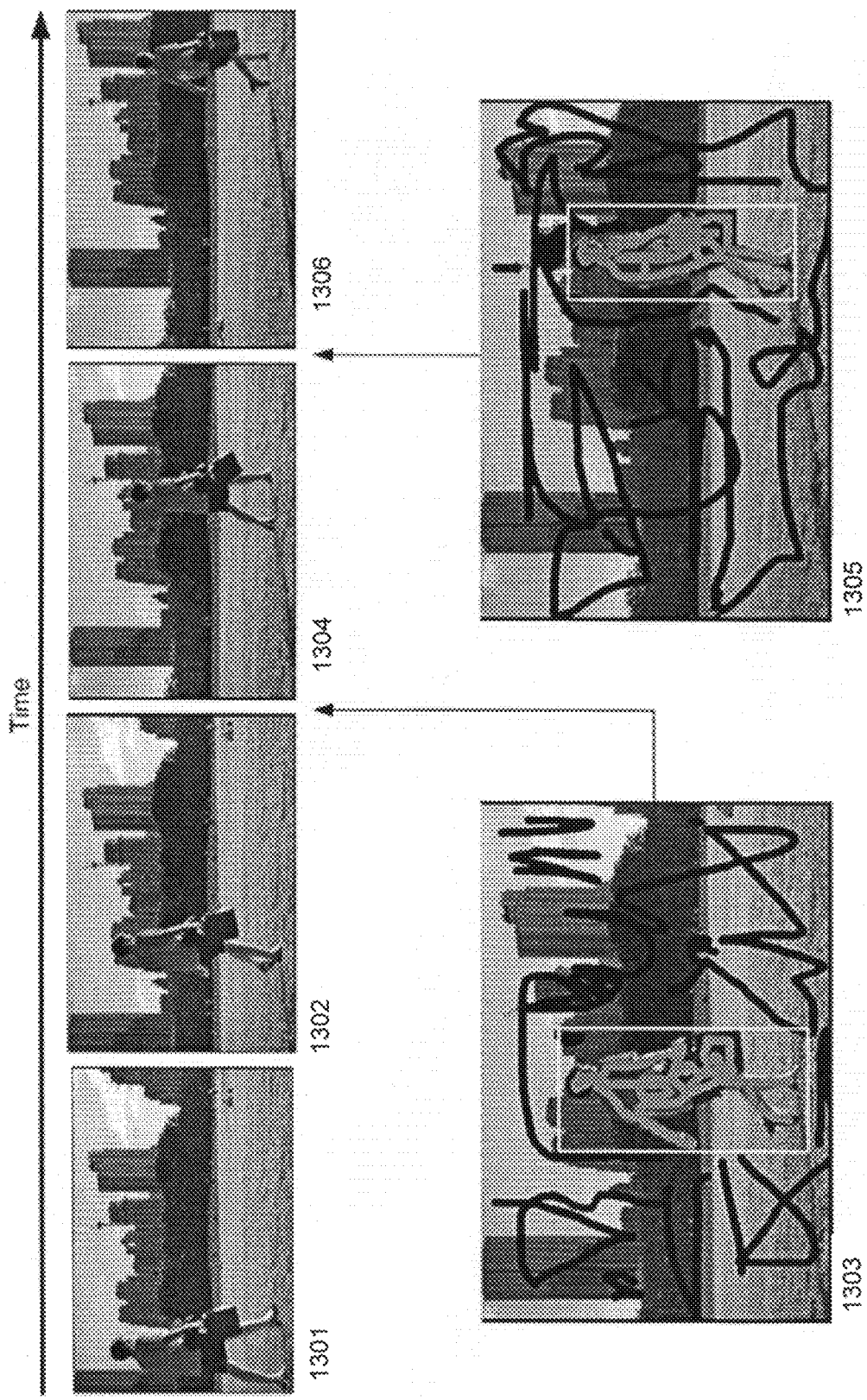
FIG. 17 shows the sequence of images in FIG. 16 in grayscale.
Figure 18:
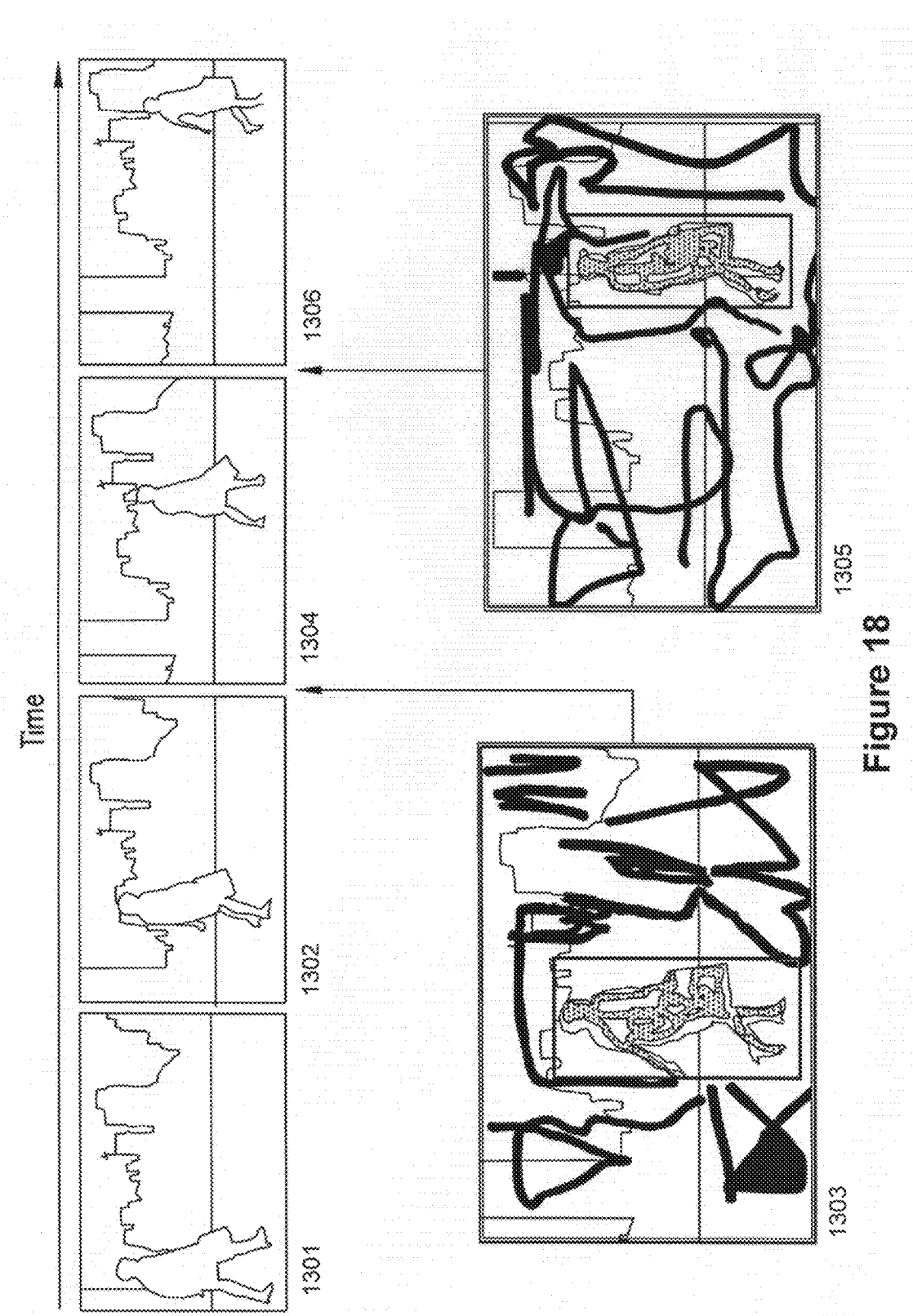
FIG. 18 shows the sequence of images in FIG. 16 in line form.
Figure 19:
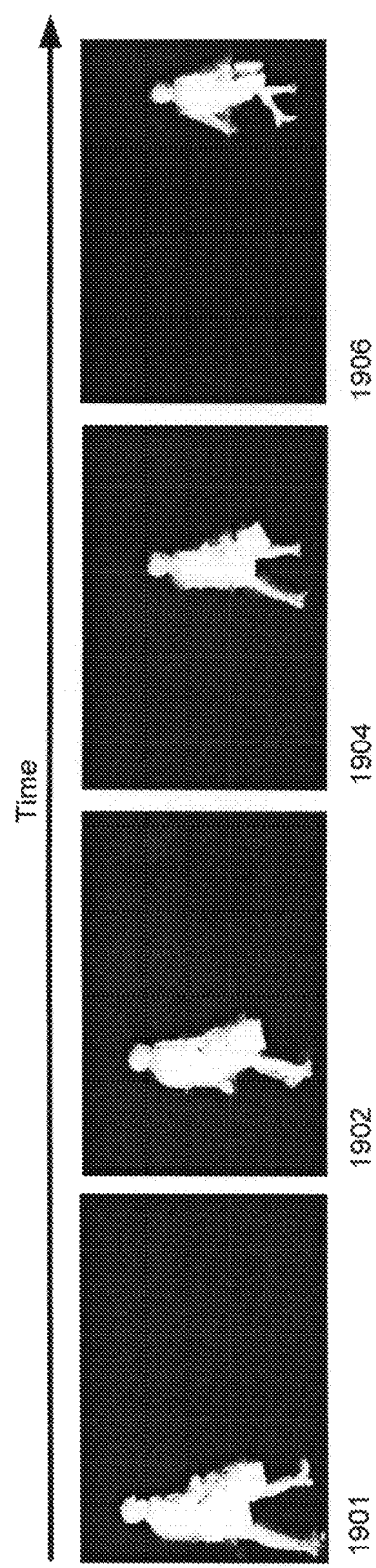
FIG. 19 shows the example masks generated for the remaining images of the sequence of images in FIG. 16.

Upon determining if the unsure pixels are to be in the mask or not in the mask in 207, the mask creation module 208 creates the mask 106 from the pixels determined to be in the mask, wherein the area of the image not in the mask 106 is the pixels determined not to be in the mask. FIGS. 10 and 19 illustrate masks generated for the color images of FIGS. 4 and 13, respectively, from the user inputs illustrated as brushstrokes in the color images of FIGS. 7 and 16, respectively.

In one embodiment, the mask 106 may be a soft mask (i.e., have soft edges) so that modifications to unmasked portions of the image 102 may blend into masked portions of the image 102. In one embodiment, unsure pixels are analyzed in order to determine whether the pixels are included in the soft edge. In one example analysis, the mask creation module 105 determines if the unsure pixels form an edge between the pixels to be in the mask and the pixels not to be in the mask. If the application determines the pixel(s) to be part of an edge, then the characteristics of the nonmask portion of the image are blended with the characteristics of the mask portion of the image for the unsure pixels (as part of a soft edge).

Upon creation of the mask 106, the user may use the mask 106 in order to modify the image 102 (or, for video, other images related to the image 102 in the sequence of images in the video) using the mask in order to cover portions of the image not to be modified or remove portions of the image to be modified exclusively.

Examples of Creating Masks and Modifications to Images Using the Masks

FIGS. 4-12 show images of an example of modifying images using a generated mask from the mask generation system 100 of FIG. 1. In the example, FIGS. 4-12 illustrate graying the background of a sculpture and sidewalk. The mask (FIG. 10) covers the sculpture and sidewalk portion of the image.

FIGS. 13-19 illustrate an example generation of a mask for a video of a woman walking. FIGS. 13-15 shows the sequence of images 1301-1306 of a video. User inputs are received for image 1303 and 1305 of the sequence, illustrated in FIGS. 16-18. The classifier may be created from the user inputs. Then, the classifier may be used for the images 1301-1302, 1304, and 1306 in order to generate masks for those images of the video. The mask (FIG. 19) in each of the images covers the woman.

Example Computer Architecture

Figure 20:
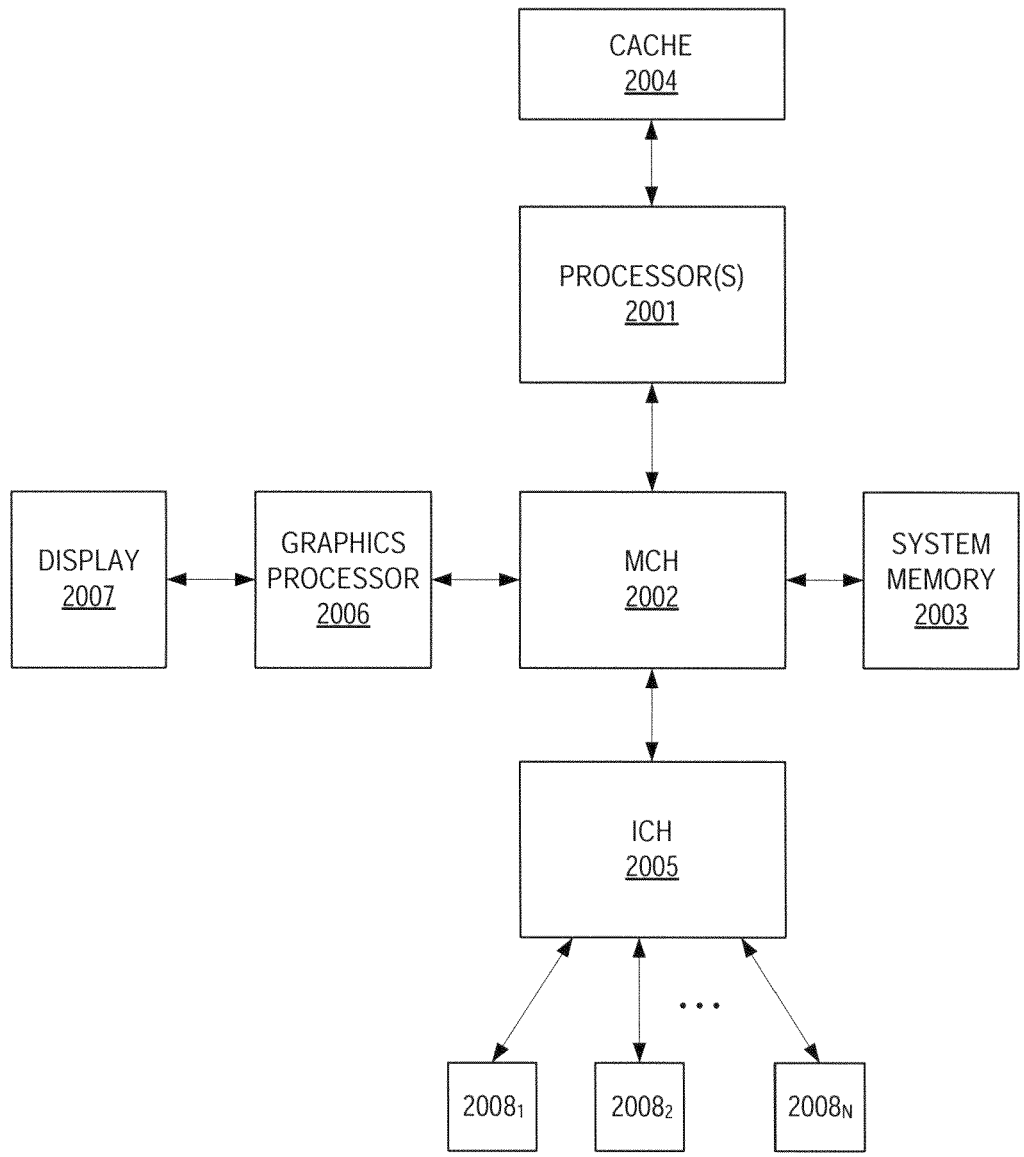
FIG. 20 shows an exemplary computer system for implementing the example system 100 in FIG. 1 and the exemplary methods in FIGS. 2 and 3.

FIG. 20 illustrates an example computer architecture for implementing the system 100 of FIG. 1 and the exemplary methods of FIGS. 2 and 3. The computing system of FIG. 20 includes: 1) one or more processors 2001; 2) a memory control hub (MCH) 2002; 3) a system memory 2003 (of which different types exist such as DDR RAM, EDO RAM, etc,); 4) a cache 2004; 5) an I/O control hub (ICH) 2005; 6) a graphics processor 2006; 7) a display/screen 2007 (of which different types exist such as Cathode Ray Tube (CRT), Thin Film Transistor (TFT), Liquid Crystal Display (LCD), DPL, etc.); and/or 8) one or more I/O devices 2008.

The one or more processors 2001 execute instructions in order to perform whatever software routines the computing system implements. The instructions frequently involve some sort of operation performed upon data. Both data and instructions are stored in system memory 2003 and cache 2004. Cache 2004 is typically designed to have shorter latency times than system memory 2003. For example, cache 2004 might be integrated onto the same silicon chip(s) as the processor(s) and/or constructed with faster SRAM cells whilst system memory 2003 might be constructed with slower DRAM cells. By tending to store more frequently used instructions and data in the cache 2004 as opposed to the system memory 2003, the overall performance efficiency of the computing system improves.

System memory 2003 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2003 prior to their being operated upon by the one or more processor(s) 2001 in the implementation of a software program. Similarly, data that a software program determines should be sent from the computing system to an outside entity through one of the computing system interfaces, or stored into an internal storage element, is often temporarily queued in system memory 2003 prior to its being transmitted or stored.

The ICH 2005 is responsible for ensuring that such data is properly passed between the system memory 2003 and its appropriate corresponding computing system interface (and internal storage device if the computing system is so designed). The MCH 2002 is responsible for managing the various contending requests for system memory 2003 access amongst the processor(s) 2001, interfaces and internal storage elements that may proximately arise in time with respect to one another.

One or more I/O devices 2008 are also implemented in a typical computing system. I/O devices generally are responsible for transferring data to and/or from the computing system (e.g., a networking adapter); or, for large scale non-volatile storage within the computing system (e.g., hard disk drive). ICH 2005 has bi-directional point-to-point links between itself and the observed I/O devices 2008.

Referring back to FIG. 1, modules of the different embodiments of the described system may include software, hardware, firmware, or any combination thereof. The modules may be software programs available to the public or special or general purpose processors running proprietary or public software. The software may also be specialized programs written specifically for RIA execution and synchronization.

In addition, elements of the present invention may also be provided as a computer-readable medium for storing the computer-executable instructions. The computer-readable medium and storage may include, but is not limited to, floppy diskettes, optical disks, CD-ROMs, and magneto-optical disks, ROMs, RAMs, EPROMs, EEPROMs, flash, magnetic or optical cards, propagation media or other type of media/computer-readable medium suitable for storing electronic instructions.

For the exemplary methods illustrated in FIGS. 2-3, embodiments of the invention may include the various processes as set forth above. The processes may be embodied in computer-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented.

For example, while the segregation of an image into two portions (in the mask, not in the mask) has been described, a user may also have more than two user inputs in order to segregate the image into more than one mask of the image (e.g., divide the image into three portions). In another example, while output of the classification of the pixels to a user has been described, the output of the classification may include, but is not limited to, storing the classification in a storage of the system or sending the classification to another module for further processing. In a further example, while inputs of pixels has been described as coming from a user, other sources for the inputs include, but are not limited to, a predefined generation algorithm, stored inputs from another image or sample, or storage.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer implemented method for creating a mask associated with an image, comprising:
receiving, by a processor, a first sample of pixels of the image identified to be included in the mask, wherein the first sample of pixels has one or more characteristics, wherein respective values for the one or more characteristics satisfy one or more criteria for inclusion in the mask;
receiving, by the processor, a second sample of pixels of the image identified to not be included in the mask, wherein the second sample of pixels has the one or more characteristics, wherein the respective values for the one or more characteristics do not satisfy the one or more criteria for inclusion in the mask;
creating, by the processor, a classifier to classify each pixel of the image as included in the mask, not included in the mask, or unsure;
training, by the processor, the classifier using the first sample of pixels and the second sample of pixels to determine whether each pixel is to be classified as included in the mask, not included in the mask, or unsure; and
classifying, by the processor, each pixel of the image as included in the mask, not included in the mask, or unsure.

2. The method of claim 1, further comprising:
determining, by the processor, each classified unsure pixel as either included in the mask or not included in the mask, wherein determining includes comparing a first contrast between the classified unsure pixel and a first neighboring pixel classified as included in the mask and a second contrast between the classified unsure pixel and a second neighboring pixel classified as not included in the mask.

3. The method of claim 2, wherein determining each classified unsure pixel as either included in the mask or not included in the mask includes:
determining, by the processor, a first border of pixels classified as included in the mask;
determining, by the processor, a second border of pixels classified as not included in the mask;
expanding, by the processor, the first border at a first rate to include a first neighboring pixel classified as unsure, wherein the first rate is determined from a contrast between the first neighboring pixel and the first border; and
expanding, by the processor, the second border at a second rate to include a second neighboring pixel classified as unsure, wherein the second rate is determined from a contrast between the second neighboring pixel and the second border;
wherein, by the processor, the first border and the second border expand to classified unsure pixels until all pixels of the image are determined as either included in the mask or not included in the mask.

4. The method of claim 3, wherein classifying each pixel includes assigning, by the processor, a confidence level to each pixel.

5. The method of claim 4, wherein classifying each pixel includes comparing, by the processor, a threshold of the classifier to an absolute value of the confidence level of the pixel.

6. The method of claim 5, further comprising:
setting, by the processor, the threshold to a first value for classifying each pixel;
outputting, by the processor, results of the classification;
receiving, by the processor, a first input in response to the output of results of the classification;
determining, by the processor, the threshold from the first input as a second value;
reclassifying, by the processor, each pixel by comparing the confidence level of each pixel to the second value; and
outputting, by the processor, results of the reclassification.

7. The method of claim 6, further comprising:
receiving, by the processor, a second input in response to the output of results of the reclassification; and
setting, by the processor, the threshold as the second value for determining each classified unsure pixel as either included in the mask or not included in the mask, wherein determining includes comparing a first contrast between the classified unsure pixel and a first neighboring pixel classified as included in the mask and a second contrast between the classified unsure pixel and a second neighboring pixel classified as not included in the mask.

8. The method of claim 6, further comprising:
creating, by the processor, results of the classification for output; and
creating, by the processor, results of the reclassification for output;
wherein creating results of the classification and results of the reclassification include increasing, by the processor, a contrast between the pixels classified as included in the mask and the pixels classified as not included in the mask.

9. The method of claim 1, wherein creating a classifier includes:
creating, by the processor, a plurality of subclassifiers to classify a feature of each pixel as included in the mask or not included in the mask;
assigning, by the processor, a weight to each subclassifier; and
combining, by the processor, the plurality of weighted subclassifiers.

10. The method of claim 9, wherein the combination of the plurality of weighted subclassifiers is a weighted summation.

11. The method of claim 9, wherein a first subclassifier is configured to classify the texture of each pixel.

12. The method of claim 1, wherein the first sample of pixels is received via a first input from an I/O device and the second sample of pixels is received via a second input from the I/O device.

13. A non-transitory computer-readable medium on which is encoded program code, the program code to create a mask associated with an image, comprising:
program code to receive a first sample of pixels of the image identified to be included in the mask, wherein the first sample of pixels has one or more characteristics, wherein respective values for the one or more characteristics satisfy one or more criteria for inclusion in the mask;
program code to receive a second sample of pixels of the image identified to not be included in the mask, wherein the second sample of pixels has the one or more characteristics, wherein the respective values for the one or more characteristics do not satisfy the one or more criteria for inclusion in the mask;
program code to create a classifier to classify each pixel of the image as included in the mask, not included in the mask, or unsure;
program code to train the classifier using the first sample of pixels and the second sample of pixels to determine whether one or more pixels are to be classified as included in the mask, not included in the mask, or unsure; and
program code to classify each pixel of the image as included in the mask, not included in the mask, or unsure.

14. The computer-readable medium of claim 13, further comprising:
program code to determine each classified unsure pixel as either included in the mask or not included in the mask, wherein determining includes comparing a first contrast between the classified unsure pixel and a first neighboring pixel classified as included in the mask and a second contrast between the classified unsure pixel and a second neighboring pixel classified as not included in the mask.

15. The computer-readable medium of claim 13, wherein the program code to classify each pixel includes program code to assign a confidence level to each pixel.

16. The computer-readable medium of claim 15, wherein the program code to classify each pixel includes program code to compare a threshold of the classifier to an absolute value of the confidence level of the pixel.

17. The computer-readable medium of claim 16, further comprising:
program code to set the threshold to a first value for classifying each pixel;
program code to output results of the classification;
program code to receive a first input in response to the output of results of the classification;
program code to determine the threshold from the first input as a second value;
program code to reclassify each pixel by comparing the confidence level of each pixel to the second value; and
program code to output results of the reclassification.

18. The computer-readable medium of claim 17, further comprising:
program code to receive a second input in response to the output of results of the reclassification; and
program code to set the threshold as the second value for determining each classified unsure pixel as either included in the mask or not included in the mask, wherein determining includes comparing a first contrast between the classified unsure pixel and a first neighboring pixel classified as included in the mask and a second contrast between the classified unsure pixel and a second neighboring pixel classified as not included in the mask.

19. The computer-readable medium of claim 17, further comprising:
program code to create results of the classification for output; and
program code to create results of the reclassification for output;
wherein the program code to create results of the classification and the program code to create results of the reclassification include program code to increase a contrast between the pixels classified as included in the mask and the pixels classified as not included in the mask.

20. The computer-readable medium of claim 13, wherein the first sample of pixels is received via a first input from an I/O device and the second sample of pixels is received via a second input from the I/O device.

21. The computer-readable medium of claim 13, wherein program code to create a classifier includes:
program code to create a plurality of subclassifiers, each subclassifier configured to classify a feature of each pixel as included in the mask or not included in the mask;
program code to assign a weight to each subclassifier; and
program code to create a weighted summation of the plurality of weighted subclassifiers.

22. The computer-readable medium of claim 21, wherein a first subclassifier is configured to classify the texture of each pixel.

23. The method of claim 1, wherein training the classifier comprises executing, by the processor, a training algorithm.

24. The method of claim 23, wherein the training algorithm comprises a machine learning algorithm.

25. The method of claim 23, wherein executing the training algorithm comprises performing multiple iterations of the training algorithm.

\* \* \* \* \*